(12) United States Patent
Teraji et al.

(10) Patent No.: US 11,949,834 B2
(45) Date of Patent: Apr. 2, 2024

(54) IMAGE READING DEVICE, AND METHOD OF CONTROLLING THE SAME

(71) Applicant: CANON KABUSHIKI KAISHA, Tokyo (JP)

(72) Inventors: Tomoya Teraji, Tokyo (JP); Katsutoshi Miyahara, Kanagawa (JP); Takehiko Kasamatsu, Kanagawa (JP); Shota Nonaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/074,099

(22) Filed: Dec. 2, 2022

(65) Prior Publication Data

US 2023/0208997 A1   Jun. 29, 2023

(30) Foreign Application Priority Data

Dec. 28, 2021   (JP) .................................. 2021-215137

(51) Int. Cl.
*H04N 1/193* (2006.01)
*G06V 10/10* (2022.01)
*H04N 1/387* (2006.01)

(52) U.S. Cl.
CPC ............. *H04N 1/193* (2013.01); *G06V 10/16* (2022.01); *H04N 1/3876* (2013.01)

(58) Field of Classification Search
CPC ..... G06F 18/214; G06F 18/22; G06V 40/103; H04N 25/701; H04N 25/65; H04N 25/616; H04N 1/191; H04N 1/1017; H04N 1/1934; H04N 25/7013; H04N 1/193; H04N 1/1933; H04N 23/54; H04N 1/12; H04N 1/195; H04N 1/401; H04N 7/181; H04N 23/80;

(Continued)

(56) References Cited

U.S. PATENT DOCUMENTS 4,692,812 A * 9/1987 Hirahara ................. H04N 1/193
358/443
5,259,041 A * 11/1993 Kato ....................... H04N 1/62
382/164

(Continued)

FOREIGN PATENT DOCUMENTS

JP   2008-022062   1/2008

OTHER PUBLICATIONS

U.S. Appl. No. 17/986,809, filed Nov. 14, 2022.
U.S. Appl. No. 18/148,891, filed Dec. 30, 2022.

*Primary Examiner* — Negussie Worku
(74) *Attorney, Agent, or Firm* — Venable LLP

(57) ABSTRACT

An image reading device includes linear image sensors that are arranged so that adjacent image sensors include an overlapping region in which portions of reading regions of the adjacent image sensors overlap in a main scanning direction, and a buffer unit for read image data. Image data of each overlapping region are generated by synthesizing first image data obtained by a first linear image sensor and second image data obtained by a second linear sensor, the first linear image sensor and the second linear sensor being adjacent in the main scanning direction. Image data of the predetermined line is generated based on image data in which the image data of each overlapping region are excluded from the image data stored in the buffer unit and the image data of each overlapping region. The processing is repeatedly executed in a sub-scanning direction.

13 Claims, 10 Drawing Sheets

(58) Field of Classification Search
CPC ........ H04N 25/534; H04N 25/70; H04N 1/03;
H04N 1/1931; H04N 2201/0081; H04N
25/71; H04N 1/028; H04N 1/486; H04N
23/6811; H04N 1/00827; H04N 1/14;
H04N 2201/0442; H04N 2201/0454;
H04N 25/671; H04N 25/672; H04N
7/183; H04N 1/19505; H04N 1/4076;
H04N 25/6153; H04N 25/67; H04N
25/677; H04N 25/711; H04N 3/155;
H04N 1/00087; H04N 1/02815; H04N
1/04; H04N 1/0402; H04N 1/0449; H04N
1/603; H04N 1/6094; H04N 3/1593;
H04N 1/0308; H04N 1/0405; H04N
1/0411; H04N 1/0435; H04N 1/1937;
H04N 1/19515; H04N 1/40006; H04N
23/60; H04N 25/00; H04N 25/40; H04N
25/626; H04N 25/72; H04N 25/75; H04N
1/00018; H04N 1/00031; H04N 1/00037;
H04N 1/00045; H04N 1/00053; H04N
1/00127; H04N 1/0285; H04N 1/02865;
H04N 1/0306; H04N 1/107; H04N
1/1911; H04N 1/1918; H04N 1/1951;
H04N 1/19584; H04N 1/3875; H04N
1/3878; H04N 1/40062; H04N 1/488;
H04N 1/56; H04N 1/6025; H04N 1/6027;
H04N 17/002; H04N 2201/0063; H04N
2201/0414; H04N 2209/049; H04N
23/45; H04N 23/56; H04N 23/84; H04N
23/90; H04N 25/50; H04N 25/62; H04N
25/63; H04N 25/713; H04N 1/00323;
H04N 1/0083; H04N 1/031; H04N
1/0414; H04N 1/0426; H04N 1/047;
H04N 1/113; H04N 1/1906; H04N
1/19536; H04N 1/40; H04N 1/40056;
H04N 1/6044; H04N 13/257; H04N
13/282; H04N 13/296; H04N
2201/02425; H04N 2201/03158; H04N
2201/0436; H04N 2201/04705; H04N
2201/04715; H04N 2201/04729; H04N
2201/04731; H04N 2201/04732; H04N
2201/04767; H04N 2201/04789; H04N
2201/04791; H04N 23/52; H04N 23/55;
H04N 23/843; H04N 25/11; H04N 25/53;
H04N 25/76; H04N 3/1581; H04N 5/32;
G06T 2207/10116; G06T 7/001; G06T
7/62; G06T 1/0007; G06T 1/60; G06T
2207/30141; G06T 7/0004; G06T 7/60;
G06T 2207/30108; G06T 17/10; G06T
7/0002; G06T 7/248; G06T 7/97; G06T
7/0006; G06T 7/55; G06T 17/00; G06T
2200/08; G06T 2207/10028; G06T
2207/10081; G06T 2207/20112; G06T
2207/30241; G06T 2210/56; G06T
3/4007; G06T 7/64
USPC ........................................................ 358/474
See application file for complete search history.

(56) References Cited

U.S. PATENT DOCUMENTS

| 5,262,870 | A | * | 11/1993 | Nakamura | ........... | H04N 25/701 |
| | | | | | | 348/E3.027 |
| 6,822,213 | B2 | * | 11/2004 | Stark | ................. | H01L 27/14643 |
| | | | | | | 348/300 |
| 7,154,630 | B1 | * | 12/2006 | Nimura | .............. | H04N 1/00175 |
| | | | | | | 358/1.18 |
| 7,646,925 | B2 | * | 1/2010 | Kato | .................... | H04N 1/3875 |
| | | | | | | 382/233 |
| 2006/0165264 | A1 | * | 7/2006 | Saitoh | .................. | G06V 40/103 |
| | | | | | | 382/115 |
| 2013/0157282 | A1 | * | 6/2013 | Bouzid | ................ | H04N 1/1017 |
| | | | | | | 435/7.1 |
| 2014/0206568 | A1 | * | 7/2014 | Bouzid | .................. | G01N 21/62 |
| | | | | | | 435/7.92 |
| 2020/0254771 | A1 | * | 8/2020 | Netsu | ................... | G01F 23/2927 |
| 2021/0112174 | A1 | * | 4/2021 | Kamio | ............... | H04N 1/00068 |
| 2021/0171303 | A1 | * | 6/2021 | Miyahara | ................. | B65H 7/14 |
| 2022/0070327 | A1 | | 3/2022 | Kamio et al. | ............ | H04N 1/00 |

* cited by examiner

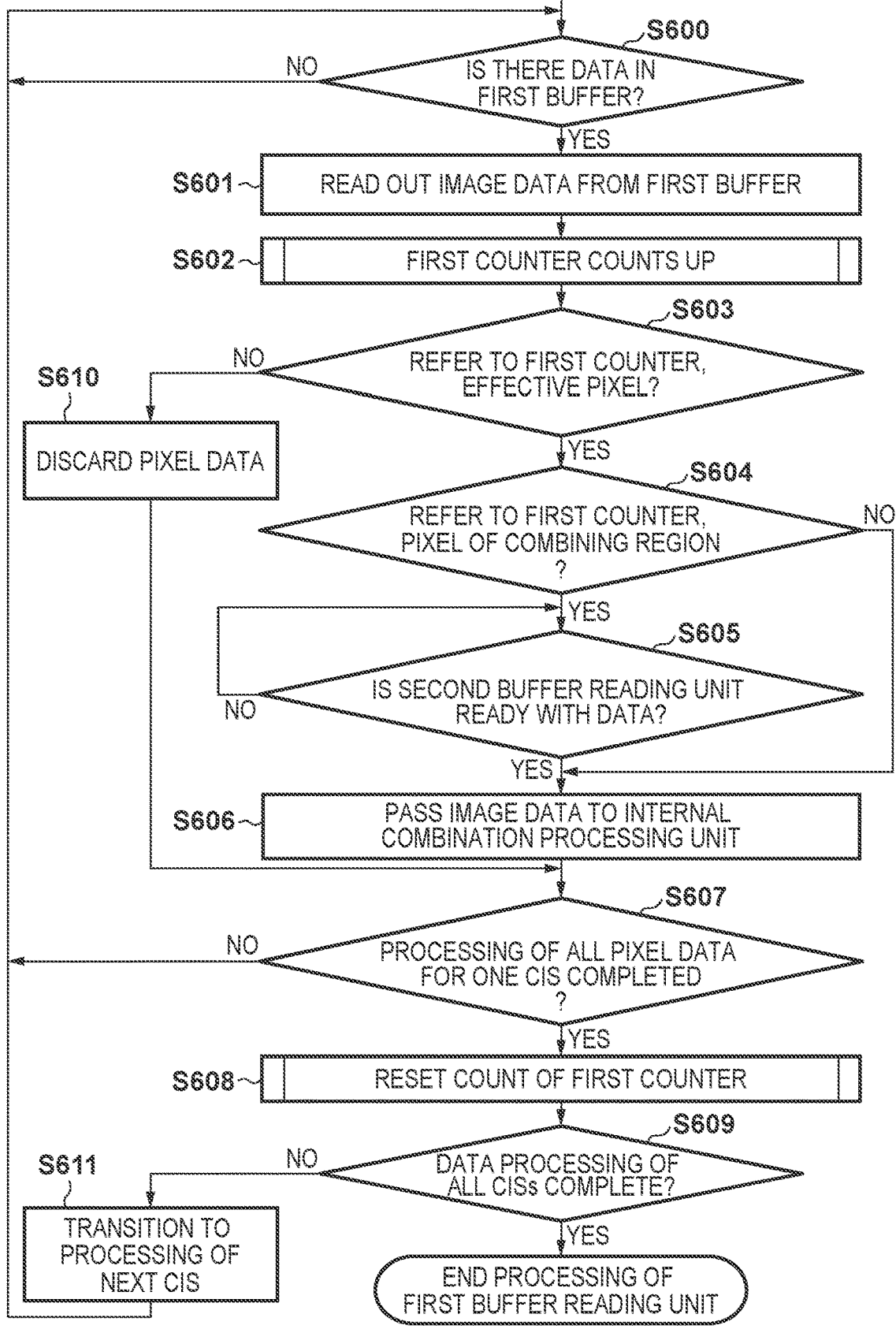

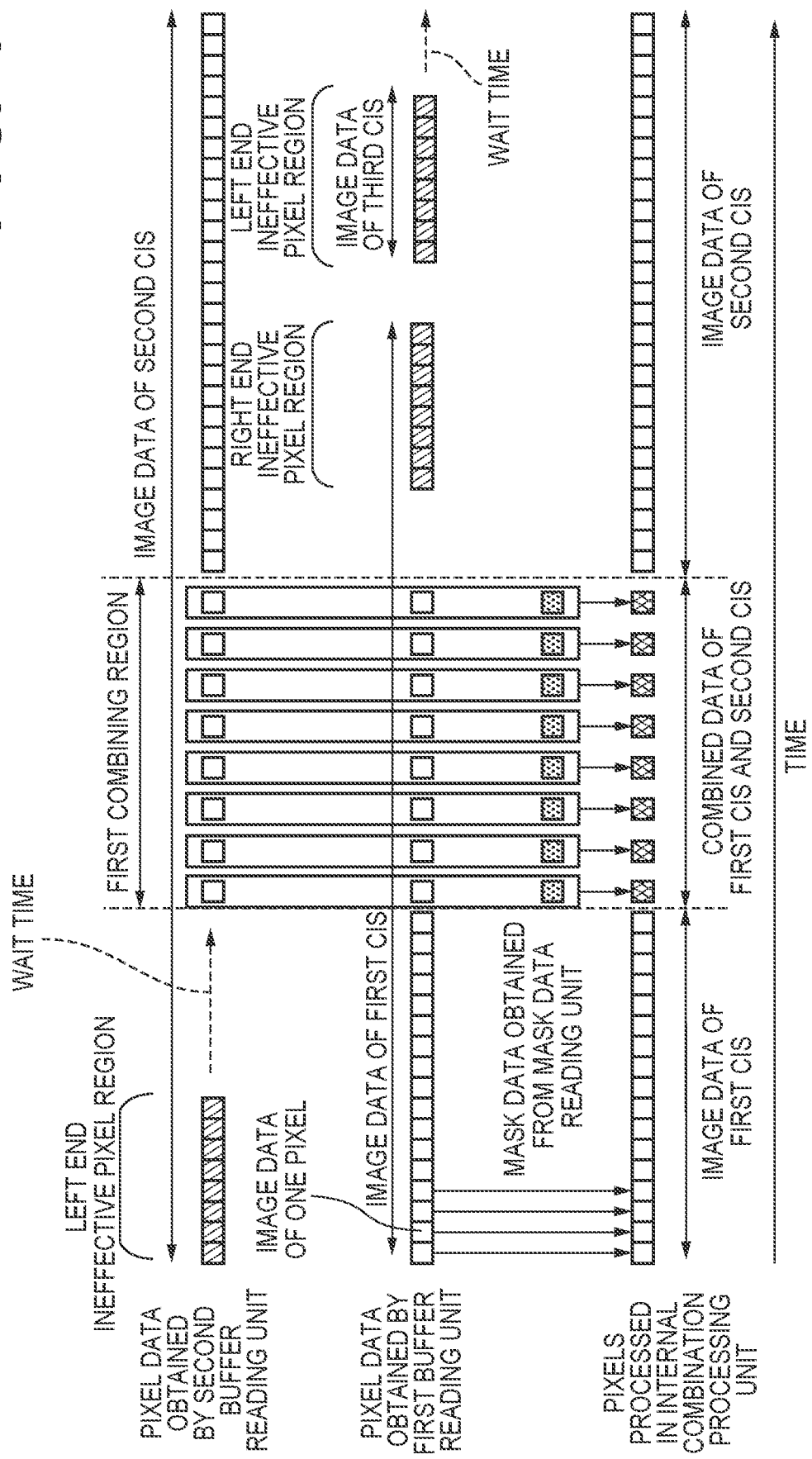

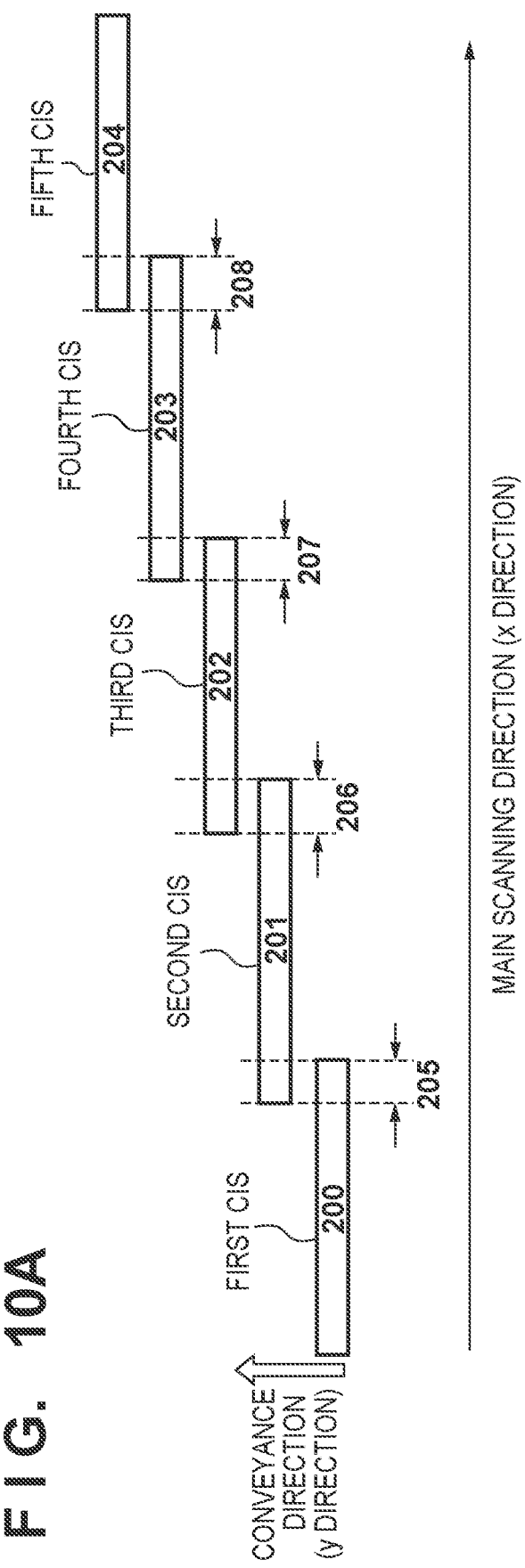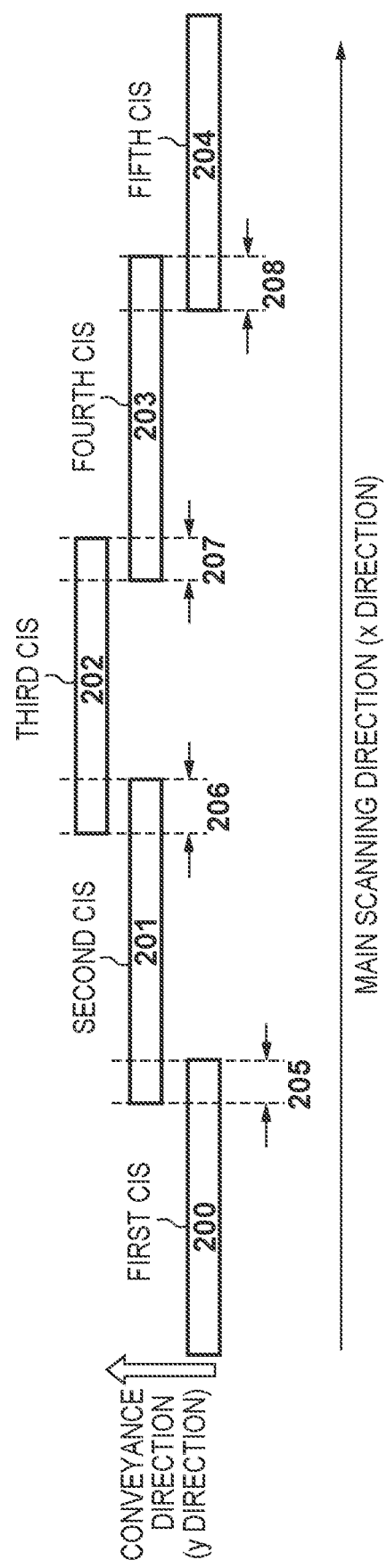

IMAGE READING DEVICE, AND METHOD OF CONTROLLING THE SAME

BACKGROUND OF THE INVENTION

Field of the Invention

The present invention relates to an image reading device, a method of controlling the same, and a non-transitory computer-readable storage medium.

Description of the Related Art

Conventionally, image reading devices in which a plurality of image sensors are arranged to be staggered in two rows in order to read an image that has been printed on a medium, such as large-format paper, are known. Regarding such image reading devices, it is possible to inexpensively manufacture image reading devices that are capable of reading large-format paper and the like, for example, by using a plurality of A4-sized image sensors and the like. In a method in which a plurality of image sensors are thus used, it is necessary to include an image processing unit for each of the plurality of installed image sensors and by connecting the image data of the plurality of image sensors, ultimately form one line's worth of large image data.

In a technique disclosed in Japanese Patent Laid-Open No. 2008-022062, three image sensors (CIS 1 to 3) each perform reading such that a portion thereof overlaps an adjacent sensor in a main scanning direction, and one controller performs combination processing for connecting the image data thereof. The sensors are arranged to be staggered; the sensor CIS 2 is upstream in a sub-scanning direction and at certain distances downstream therefrom are the sensors CIS 1 and CIS 3. Here, when combining image data of the preceding image sensor (CIS 2) and image data of the two subsequent image sensors (CIS 1 and CIS 3), image data, which has been obtained by the preceding image sensor, is stored in an interpolation buffer, and image data is outputted by combining image data of combining regions of the image data, which has been obtained by the preceding image sensor, and image data, which has been obtained by the subsequent image sensors, with each other.

As described above, in a conventional device, regarding image data in a combining region, once image data, which has been obtained by either of the CISs, has been read out from a memory or the like, it is necessary to store the image data in a temporary storage buffer. Accordingly, it is necessary to provide a combining region's maximum width's worth of storage buffer, which poses a problem that the circuit scale becomes large. In addition, image data of an image sensor to be processed next cannot be read out from a memory and cannot be subjected to image processing until image data of an entire region of one image sensors had been read out from the memory. Therefore, there is a problem that it leads to a decrease in processing speed.

SUMMARY OF THE INVENTION

The present invention provides a technique for allowing execution of processing of image data in a combining region while suppressing an increase in circuit scale.

According to an aspect of the invention, there is provided an image reading device comprising: a plurality of linear image sensors that are arranged so that adjacent image sensors include an overlapping region in which portions of reading regions of the adjacent image sensors overlap in a main scanning direction in which a document is read; a buffer unit configured to store image data obtained by the plurality of linear image sensors reading a predetermined line of the document; a determination unit configured to read out the image data stored in the buffer unit and determine image data that corresponds to a plurality of overlapping regions; a synthesis unit configured to generate image data of each of the plurality of overlapping regions by synthesizing first image data obtained by a first linear image sensor and second image data obtained by a second linear sensor, the first linear image sensor and the second linear sensor being adjacent in the main scanning direction among the plurality of linear image sensors; a generation unit configured to generate image data of the predetermined line of the document based on image data in which the image data of each of the plurality of overlapping regions are excluded from the image data stored in the buffer unit and the image data of each of the plurality of overlapping regions generated by the synthesis unit; and a control unit configured to control so as to repeatedly execute, in a sub-scanning direction of the document, processing by the buffer unit, the determination unit, the synthesis unit, and the generation unit on the predetermined line of the document.

Further features of the present invention will become apparent from the following description of exemplary embodiments (with reference to the attached drawings).

BRIEF DESCRIPTION OF THE DRAWINGS

FIG. 6 is a flowchart for explaining one line's worth of data processing that is to be performed by a first buffer reading unit according to an embodiment.

FIG. 7 is a diagram for schematically explaining a flow in which an internal combination processing unit 514 according to an embodiment processes image data from the first buffer reading unit, a second buffer reading unit, and a mask data reading unit.

FIGS. 10A and 10B are diagrams illustrating examples of an arrangement of CISs according to another embodiment.

DESCRIPTION OF THE EMBODIMENTS

Figure 1A:
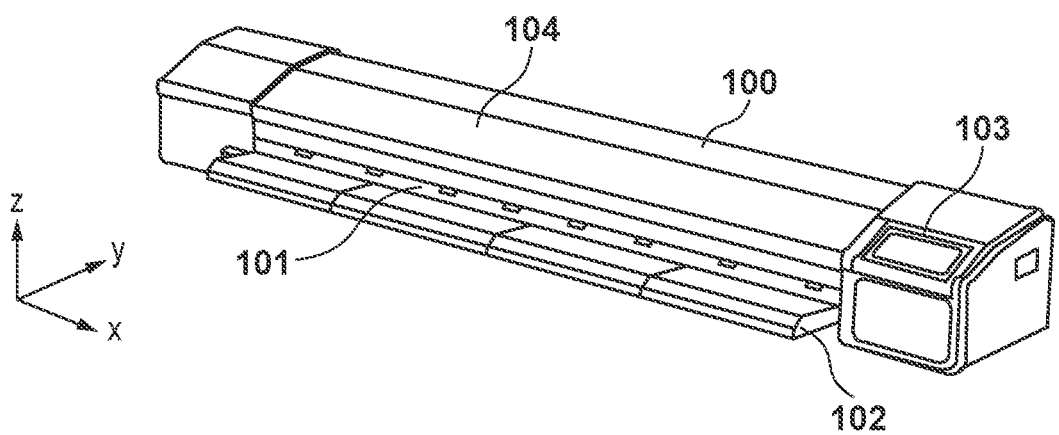
FIGS. 1A and 1B are an external perspective view and a schematic cross-sectional view of a reading device (scanner) according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In an embodiment that will be described below, a description will be given using as an example a sheet-feed-type image reading device (hereinafter, referred to as a scanner); however, the scope of application of the present invention is not limited to this, and the present invention can also be applied to flatbed-type image reading devices.

FIG. 1A is a perspective view illustrating an external view of a sheet-feed-type scanner 100 according to an embodiment.

As illustrated in FIG. 1A, the scanner 100 includes a document feeding port 101 and a document feeding tray 102 on a front side of a main body. A user places a leading end of a document so that a central portion of the document is positioned at a center of the feeding port on the document feeding tray 102 and inserts it into the document feeding port 101 as if sliding it over the document feeding tray 102. The document feeding port 101 is designed to be able to allow a certain degree of a positional shift, a tilt, and the like at the time of insertion with respect to a width, which is in a main scanning direction, of a document that can be read by the scanner 100. A configuration of a document feeding path will be described in detail with reference to FIG. 1B.

The scanner 100 includes an operation unit 103, which includes physical keys, a liquid crystal panel, and the like, on an upper surface of the main body, and the user can set read conditions and input a document size via the operation unit 103. In addition, the upper surface of the scanner 100 is provided with an upper cover 104, and by opening the upper cover 104 upward, a reading unit and the like becomes accessible, and thereby it becomes possible to perform maintenance of the main body.

Figure 1B:
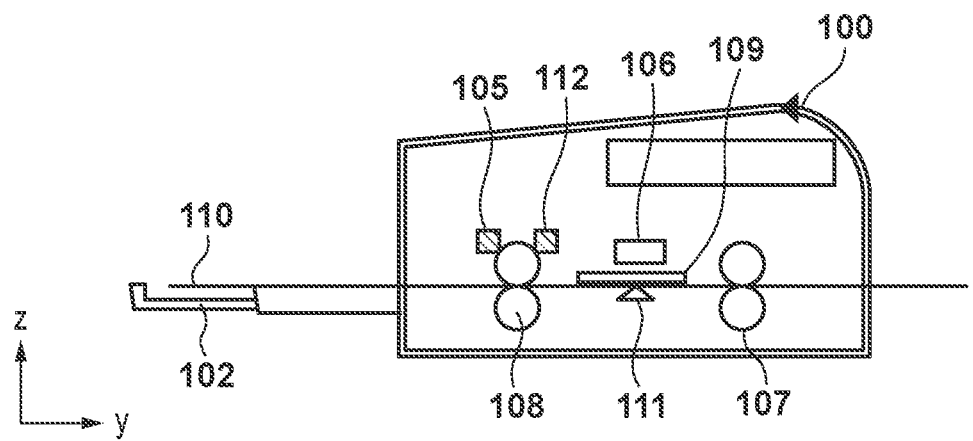

FIG. 1B is a schematic cross-sectional view illustrating an inner configuration of the scanner 100 according to the embodiment.

In FIG. 1B, a left side is an upstream side of document feeding and a right side is a downstream side, and a document 110 is conveyed in a y-axis direction. The document 110, which has been fed by the user along the document feeding tray 102, is discharged from a rear side of the main body via a flat conveyance path. A document detection sensor 105 detects insertion of the document 110, and when the insertion of the document 110 is detected, upstream document conveyance rollers 108 are rotationally driven to pull the document 110 into the conveyance path. An edge detection sensor 112 is used to detect a leading end of the document 110, which has been pulled into the conveyance path by the rotation of the upstream document conveyance rollers 108. A result of detection of the edge detection sensor 112 is used for determining a read start position of the document 110, detecting a position of a trailing end of the document 110, and the like. Inside the conveyance path, the document 110 passes between a glass plate 109 and a document pressing plate 111. The document pressing plate 111 serves to press the document 110 against the glass plate 109 at a predetermined pressure.

A CIS 106 is a linear image sensor (hereinafter, CIS) whose read surface is arranged in the main scanning direction. The read surface of the CIS 106 faces the glass plate 109 and is designed such that a focus position of the reading is positioned on a plane on which the document 110 and the glass plate 109 contact. Downstream document conveyance rollers 107 are configured to be driven by the upstream document conveyance rollers 108 via a belt (not illustrated) and play a role of discharging to the downstream side the document 110 after it has passed through a region in which it is pressed to the glass plate 109 by the document pressing plate 111. The scanner 100 further includes respective detection sensors, a motor (not illustrated) for rotating the upstream document conveyance rollers 108, a circuit board for controlling the CIS 106 and the operation unit 103, and the like.

Figure 2A:
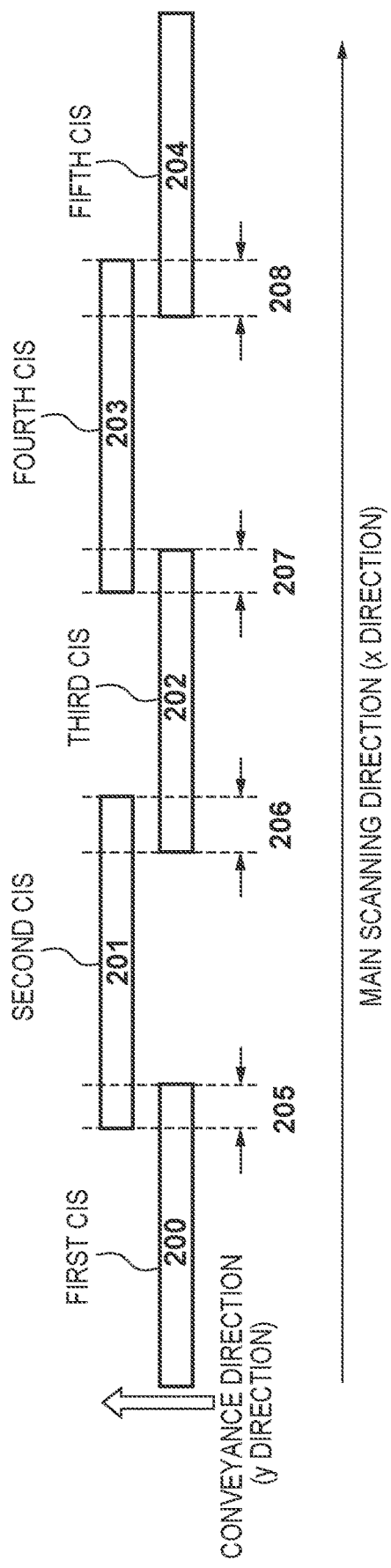
FIGS. 2A and 2B are diagrams for explaining a configuration of linear image sensors according to an embodiment.

FIG. 2A is a diagram for explaining a configuration of the linear image sensor (CIS) 106 according to the embodiment. Regarding the CIS 106, five CISs are arranged to be staggered in two rows, and these CIS are arranged to be parallel to each other in the main scanning direction and such that portions of reading regions of adjacent CISs overlap in the main scanning direction.

Regarding a right end side of a first CIS 200 and a left end side of a second CIS 201, reading portions overlap in the main scanning direction. This overlapping portion is set as a first overlapping region 205. Similarly, regarding a right end side of the second CIS 201 and a left end side of a third CIS 202, reading portions overlap in the main scanning direction. This overlapping portion is set as a second overlapping region 206. Each time the number of CISs increases, the overlapping regions increase, and when a fourth CIS 203 and a fifth CIS 204 are added and there are five CISs, there are a third overlapping region 207 and a fourth overlapping region 208 as illustrated in FIG. 2A.

Figure 2B:
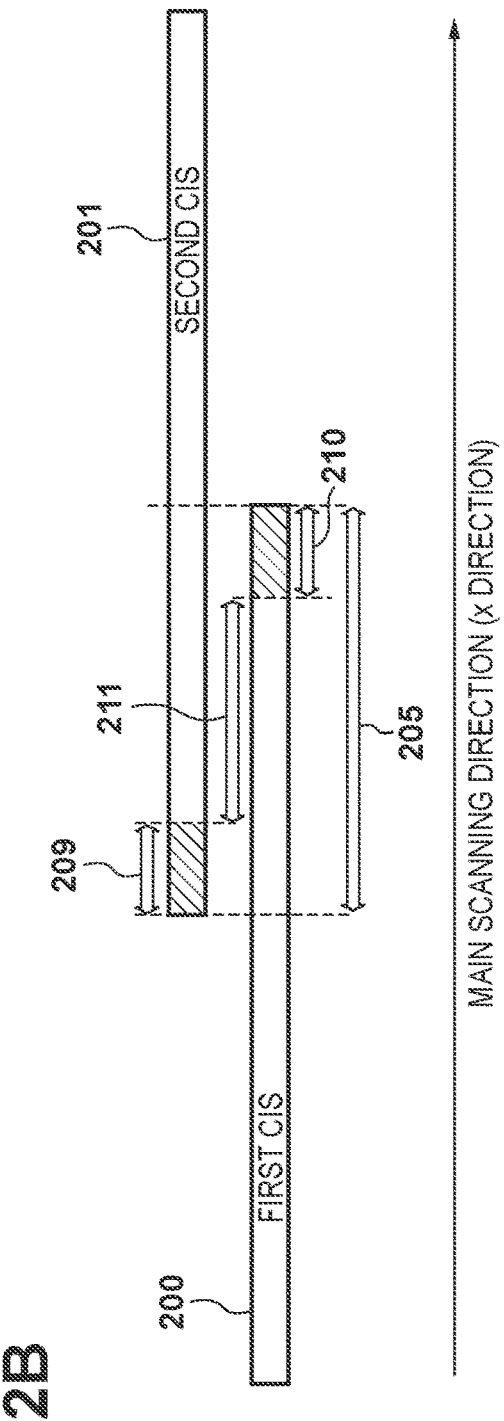

FIG. 2B is an enlarged view of the first overlapping region 205.

On a left end side and a right end side of each CIS, there is an ineffective pixel region in which it is assumed that obtained image data is to be discarded, and they are set as a left end ineffective pixel region 209 and a right end ineffective pixel region 210, respectively. Of the first overlapping region 205, a region from which the left end ineffective pixel region 209 and the right end ineffective pixel region 210 have been excluded is set as a first combining region 211. The first combining region 211 is a region in which image data that has been outputted from the first CIS 200 and image data that has been outputted from the second CIS 201 are synthesized into one image data based on ratio data. There are such ineffective pixel regions and a combining region for each overlapping region. However, depending on a configuration inside the CIS, there are cases where pixels at either end are also treated as effective pixels. In such cases, it may be that one or both of the left end ineffective pixel region 209 and the right end ineffective pixel region 210 is not present.

Figure 3:
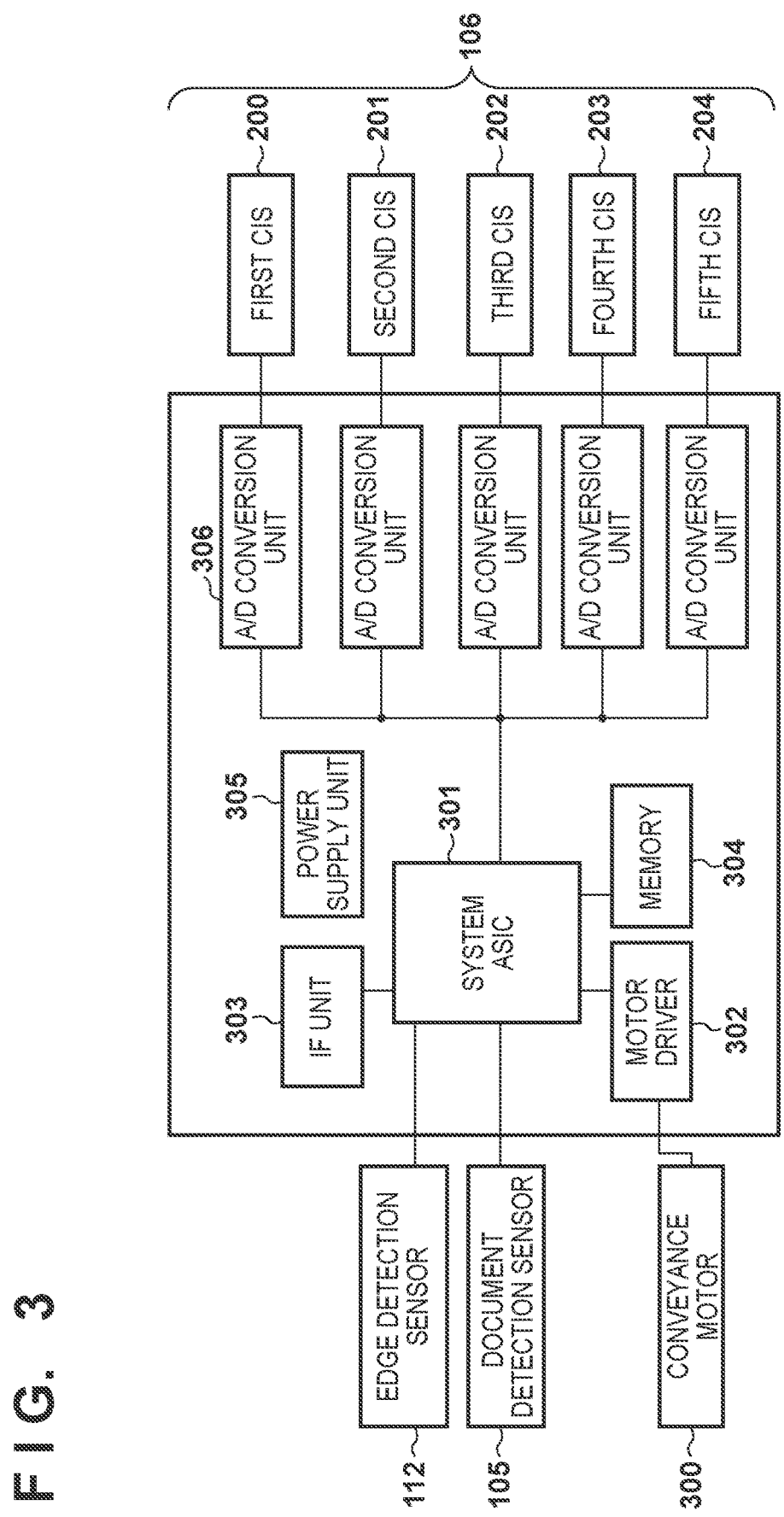
FIG. 3 is a block diagram for explaining a hardware configuration of a control system in the scanner according to an embodiment.

FIG. 3 is a block diagram for explaining a hardware configuration of a control system in the scanner 100 according to the embodiment.

A conveyance motor 300 is controlled from a system ASIC (hereinafter, simply referred to as ASIC) 301 via a motor driver 302 and controls conveyance of documents by rotating the above-described upstream document conveyance rollers 108 and the downstream document conveyance rollers 107. Outputs of the document detection sensor 105 and the edge detection sensor 112 are inputted to the ASIC 301. The ASIC 301 determines a driving timing of the plurality of CISs 200 to 204 based on changes in output signals of these sensors and a state of the conveyance motor 300 and controls the plurality of CISs 200 to 204. Analog signals, which are image data that have been obtained by reading a document with the plurality of CISs 200 to 204, are converted into digital signals by the respective A/D conversion units 306 and are inputted to the ASIC 301. The ASIC 301 can process the data that has been converted into digital signals by the A/D conversion units 306 and transmit it as image data to an external device that is connected by a USB, a LAN, or the like via an IF unit 303. A power supply unit 305 performs power supply by generating a voltage that is necessary for the respective units.

Figure 4:
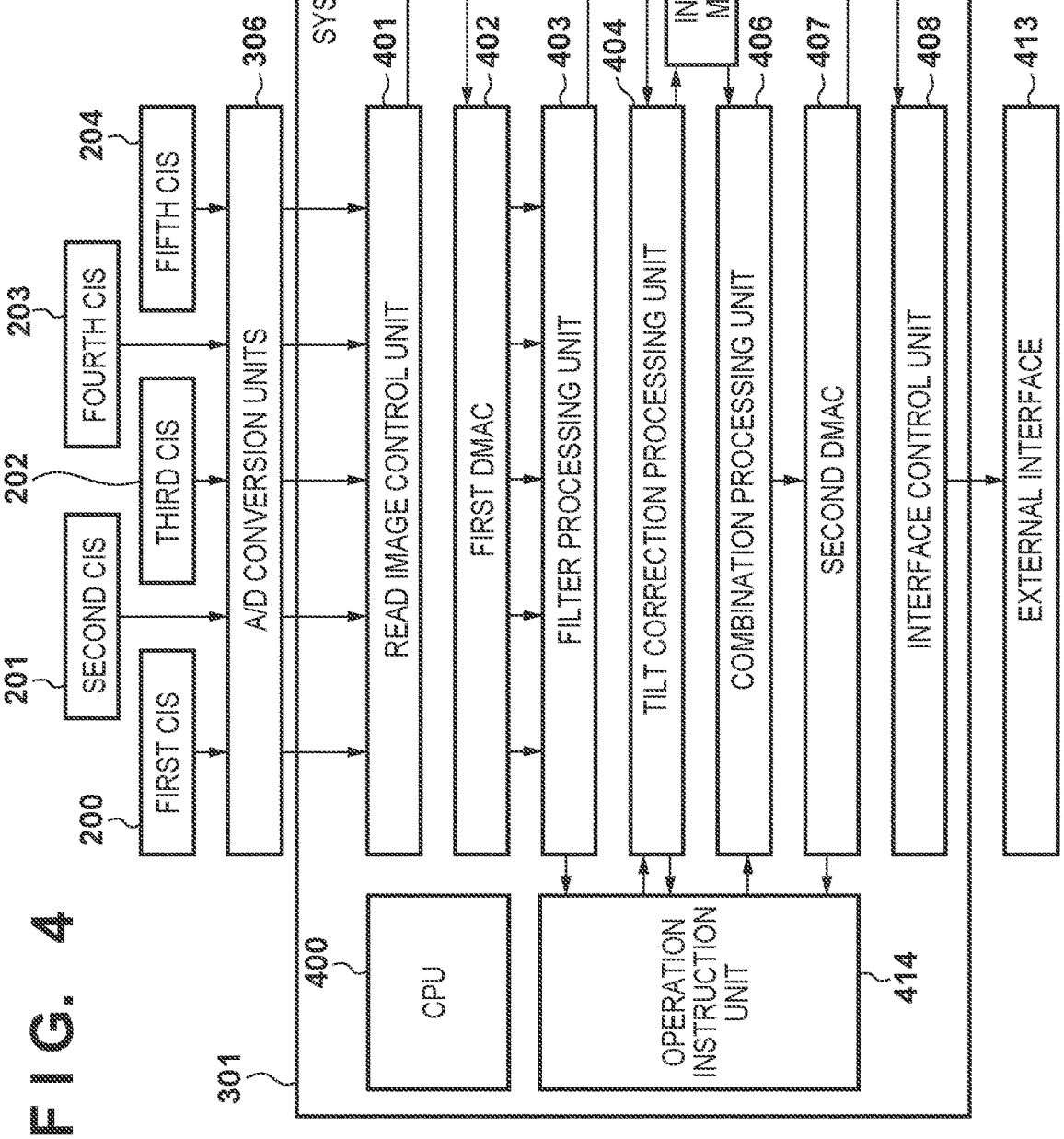
FIG. 4 is a block diagram for explaining an inner configuration of an ASIC according to an embodiment.

FIG. 4 is a block diagram for explaining an inner configuration of the ASIC 301 according to an embodiment.

Image data from the respective CISs is converted into digital signals from analog signals by the A/D conversion units 306 and then inputted. In the ASIC 301, the image data that has been inputted from the A/D conversion units 306 to the ASIC 301 is received on a line-by-line basis and is outputted to a read image buffer 410 of an external memory 409 via a read image control unit 401. Then, the image data that has been received on a line-by-line basis is read out from the read image buffer 410 by a first DMAC 402 of the ASIC 301. Since the respective CISs, which are arranged to be staggered, are shifted in the sub-scanning direction as illustrated in FIG. 2, read timings of the same line are different between even-numbered CISs, which perform reading earlier, and odd-numbered CISs, which perform reading later. Taking into account this shift in read timings, the first DMAC 402 plays a role of reading out the image data from the read image buffer 410 of the external memory 409 at a timing at which one-line's worth of image data from the respective CISs has been obtained.

The image data that has thus been read out by the first DMAC 402 is filtered by a filter processing unit 403, which is a processing circuit for reducing noise that is included in the image data from the CISs and changing a spatial frequency. After filtering the image data, the filter processing unit 403 stores the processed image data in a tilt processing buffer 411 in the external memory 409. Then, the image data that has been stored in the tilt processing buffer 411 is processed by a tilt correction processing unit 404, which corrects a tilt of image data that has been caused by tilts of the respective CISs due to mounting tolerance. The image data that has thus been filtered and on which tilt correction processing has thus been performed is stored in an internal memory 405 of the ASIC 301. In the following description, there are cases where image data that has been obtained by reading an image by the CISs, processed, and then stored in the internal memory 405 is referred to as "image data of CISs".

One line's (a predetermined line's) worth of CIS data that has been thus stored in the internal memory 405 of the image data is read out by a combination processing unit 406. The read-out image data becomes the document's one line's worth of image data by combination processing. The document's one line's worth of digital image data, which has been generated by the combination processing, is written to an interface buffer 412 of the external memory 409 by a second DMAC 407. One line's worth of image data that has been written to the interface buffer 412 is read out by an interface control unit 408 and is then outputted from an external interface 413.

Image data of each line is thus generated and outputted along with the conveyance of the document, and finally, image data which represents an image of the document is outputted.

The ASIC 301 includes an operation instruction unit 414, and the operation instruction unit 414 includes a processing start instruction function of instructing a particular block to start processing and a processing end reception function of receiving a notification of an end of processing from a particular block. The operation instruction unit 414 is responsible for a function of sequentially operating the respective blocks using these functions. The ASIC 301 is provided with a CPU 400, and the CPU 400 plays a role of setting setting values of the respective processing blocks and instructing a start of the overall processing.

Figure 5:
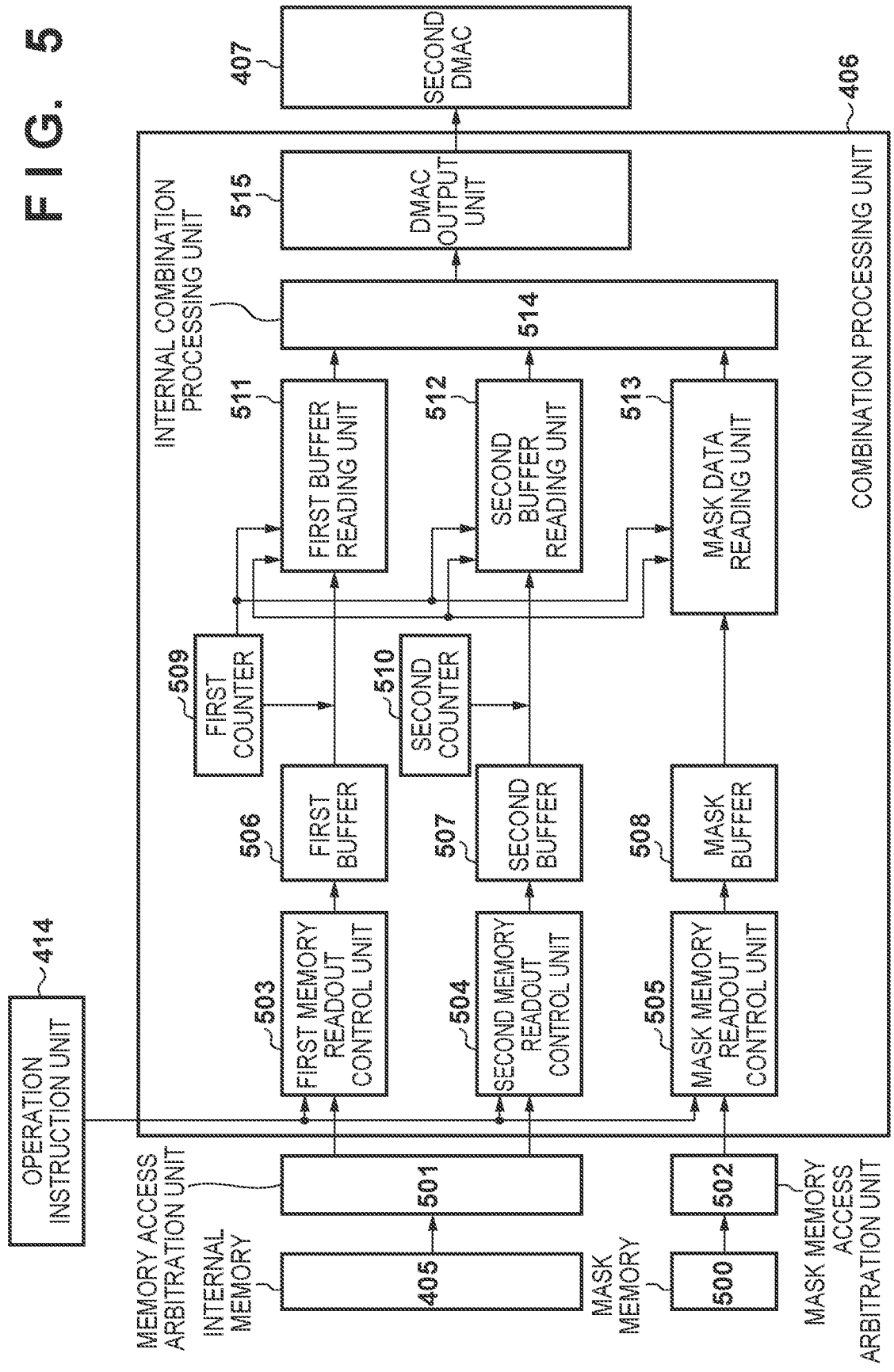
FIG. 5 is a block diagram for explaining a configuration of a combination processing unit according to an embodiment.

FIG. 5 is a block diagram for explaining a configuration of the combination processing unit 406 according to an embodiment.

A first memory readout control unit 503 reads out image data of odd-numbered CISs from the internal memory 405, and a second memory readout control unit 504 reads out image data of even-numbered CISs from the internal memory 405. Accordingly, in a case of a scanner that is configured by five CISs, the image data of the first CIS 200, the third CIS 202, and the fifth CIS 204 are read out from the internal memory 405 by the first memory readout control unit 503, and the image data of the second CIS 201 and the fourth CIS 203 are read out from the internal memory 405 by the second memory readout control unit 504.

Upon receiving a notification of an instruction for starting processing from the operation instruction unit 414, the first memory readout control unit 503 and the second memory readout control unit 504 makes a request to a memory access arbitration unit 501 to read out image data from the internal memory 405. The memory access arbitration unit 501 sequentially performs readout processing for the readout requests from the respective readout control units so as not to cause contention of access and passes the read-out image data to the respective corresponding memory readout control units. In the embodiment, a configuration in which four pixel's worth of image data is read out in a single readout from the internal memory 405 is assumed.

The first memory readout control unit 503 arranges the read-out image data into per-pixel pixel data and performs processing in order of the first CIS 200, then the third CIS 202, and then the fifth CIS 204. The first memory readout control unit 503 continues to pass pixel data to a first buffer 506 until processing of one line's worth of image data is completed. Similarly, the second memory readout control unit 504 arranges the read-out image data into per-pixel pixel data, performs processing in order of the second CIS 201 and then the fourth CIS 203, and continues to pass pixel data to a second buffer 507 until processing of one line's worth of image data is completed. When the first buffer 506 becomes full from stored pixel data, the first memory readout control unit 503 stops passing pixel data to the first buffer 506. At the same time, the first memory readout control unit 503 temporarily stops reading out pixel data from the internal memory 405. Similarly, regarding processing of the second buffer 507, when the second buffer 507 becomes full from stored pixel data, the second memory readout control unit 504 stops passing pixel data to the second buffer 507 and, at the same time, temporarily stops reading out pixel data from the internal memory 405. Then, when there occurs a free region of four or more pixels in the first buffer 506, the first memory readout control unit 503 resumes the processing for reading out pixel data. Similarly, when there occurs a free region of four or more pixels in the second buffer 507, the second memory readout control unit 504 resumes the processing for reading out pixel data.

The pixel data that is stored in the first buffer 506 is read out by a first buffer reading unit 511, and the pixel data of the second buffer 507 is read out by a second buffer reading unit 512. The first buffer reading unit 511 and the second buffer reading unit 512 determine whether the read-out pixel data is that of a pixel (ineffective pixel) of an ineffective pixel region, and if they determine that the pixel data is that of an ineffective pixel, they discard the pixel data without passing it to the internal combination processing unit 514. Regarding the determination of whether the pixel is an ineffective pixel or an effective pixel, counted values of a first counter 509 and a second counter 510 are referred to. The first counter 509 counts the number of pixels that have been read out from the first buffer 506, and the second counter 510 counts the number of pixels that have been read out from the second buffer 507. By comparing the counted values of the counters with values which indicate ineffective pixel regions of the respective CIS and are specified by the CPU 400, it is determined whether the read-out pixel data is that of an ineffective pixel. The processing of the buffer reading units 511 and 512 will be described later in detail.

Regarding the processing for combining image data of the respective CISs, processing in which mask data is used is performed. The mask data is stored in advance in a mask memory 500 and is read out by a mask memory readout control unit 505. In the embodiment, it is assumed that four pixel's worth of mask data is read out in a single readout from the mask memory 500. Upon receiving a notification of an instruction for starting processing from the operation instruction unit 414, the mask memory readout control unit 505 makes a request to a mask memory access arbitration unit 502 to read out the mask data from the mask memory 500. The mask memory access arbitration unit 502 sequentially processes write and readout requests so as not to cause contention between accesses, which includes an access from the CPU 400, and the read-out mask data is passed to the mask memory readout control unit 505. The mask memory readout control unit 505 arranges the data into per-pixel mask data and stores it in a mask buffer 508.

A mask data reading unit 513 performs processing based on the counted value of the first counter 509 and the counted value of the second counter 510. That is, when the counted values of the first counter 509 and the second counter 510 both indicate a combining region, the mask data reading unit 513 passes the mask data to the internal combination processing unit 514 at the same time that the first buffer reading unit 511 and the second buffer reading unit 512 each pass the image data to the internal combination processing unit 514. The internal combination processing unit 514 forms in the combining region one image data from two image data based on the mask data and transmits it to a DMAC output unit 515.

If one pixel data between the pixel data that have been read out by the first buffer reading unit 511 and the second buffer reading unit 512 is effective, processing for passing that pixel data as is to the DMAC output unit 515 is performed. The DMAC output unit 515 arranges the pixel data that has been processed by the internal combination processing unit 514 and performs processing for passing the pixel data to the second DMAC 407 so as to conform to an interface protocol of the second DMAC 407.

In the embodiment, four pixel's worth of image data is obtained in a single readout from the internal memory 405. Therefore, regarding the first buffer 506 and the second buffer 507, taking into account image data of four pixels for reception and image data for output, a size in which image data of at least eight or more pixels can be stored is desirable. It is good to determine, as appropriate, the size of the first buffer 506 and the second buffer 507 in accordance with the number of pixels that are read out in a single readout from the internal memory 405 and the processing speed of the internal combination processing unit 514 and subsequent image processing blocks. The same applies to the mask buffer 508, which stores the mask data.

FIG. 6 is a flowchart for explaining one line's worth of data processing that is to be performed by the first buffer reading unit 511 according to the embodiment.

When the first buffer reading unit 511 starts the processing, in step S600, the first buffer reading unit 511 determines whether pixel data is stored in the first buffer 506. If pixel data is not stored, in step S600, pixel data being stored in the first buffer 506 is awaited. When pixel data is stored in the first buffer 506, the processing proceeds to step S601. In step S601, one pixel's worth of pixel data is read out from the first buffer 506. In response to the pixel data being thus read, in step S602, the first counter 509 counts up once (+1 to the counted value). Next, the processing proceeds to step S603, and the counted value of the first counter 509 is referred to and it is determined whether the counted value indicates an effective pixel or a pixel of an ineffective pixel region. As described above, regarding a value that indicates whether a pixel is an effective pixel or an ineffective pixel, a value that has been specified in advance by the CPU 400 is referred to. If it is determined that the pixel is an ineffective pixel, the processing proceeds to step S610, and processing for discarding that pixel data is performed. That is, that pixel data is discarded without being passed to the internal combination processing unit 514, which is a subsequent processing block, and then the processing proceeds to step S607.

In step S603, if it is determined that the pixel is an effective pixel, the processing proceeds to step S604. In step S604, it is determined whether the pixel data that has been read out in step S601 is a pixel of a combining region by referring to the counted value of the first counter 509. As described above, regarding a value that indicates whether a pixel is a pixel of a combining region, a value that has been specified in advance by the CPU 400 is referred to. In step S604, if it is determined that the pixel is a pixel of a combining region, the processing proceeds to step S605, and if it is determined that the pixel is not a pixel of a combining region, the processing proceeds to step S606. In step S605, it is determined whether pixel data of the second buffer reading unit 512 is ready. Regarding the determination of whether the pixel data is ready, it is determined whether pixel data processing up to a pixel of a combining region has been completed by referring to the counted value of the second counter 510.

Since the processing of pixel data by the second buffer reading unit 512 is also executed in parallel in the same manner as the processing flow described using the first buffer reading unit 511, the counted value of the second counter 510 is counted up as the image processing proceeds. The first buffer reading unit 511 waits in the processing of step S605 until the processing of pixel data up to a combining region is completed by the second buffer reading unit 512. Then, when the processing of pixel data up to a pixel of a combining region is completed by the second buffer reading unit 512, the first buffer reading unit 511 advances the processing from step S605 to step S606. In step S606, the first buffer reading unit 511 passes the pixel data that has been read out by the first buffer reading unit 511 to the internal combination processing unit 514. If it is determined in step S604 that a pixel of a combining region has been detected, a timing of passing pixel data will be the same as a timing at which pixel data is passed from the second buffer reading unit 512 to the internal combination processing unit 514. A timing of passing mask data from the mask data reading unit 513 to the internal combination processing unit 514 will also be the same timing. Accordingly, two pixel data and mask data will be passed to the internal combination processing unit 514 at the same time.

Meanwhile, in step S604, if it is not determined that the pixel is a pixel of a combining region, the processing proceeds to step S606, and only the pixel data is passed from the first buffer reading unit 511 to the internal combination processing unit 514. When the processing of step S606 is completed, the processing proceeds to the processing of step S607. In step S607, it is determined whether the processing of image data of all pixels, which are comprised in one CIS, has been completed. Here, the counted value of the first counter 509 is referred to, and if the counted value matches the total number of pixels per CIS, it is determined that the processing of image data of all pixels, which are comprised in one CIS, has been completed. If it is determined that the processing of image data of the total number of pixels per CIS has been completed, the processing proceeds to step S608, the counted value of the first counter 509 is reset, and then the processing proceeds to step S609. Meanwhile, if it has not been completed, step S600 is transitioned to, processing that is the same as the processing thus far is executed, and then data processing of the next pixel is performed.

In step S609, it is determined whether image data of all CISs has been processed. That is, it is determined whether one line's worth of image data processing has been completed. If processing of one line's worth of image data has not been completed, the processing proceeds to step S611, and the processing of image data of the next CIS is transitioned to. That is, when the processing of the image data of the first CIS 200 is completed, the processing of the image data of the third CIS 202 is transitioned to. Then, when the processing of the image data of the third CIS 202 is completed, the processing of the image data of the fifth CIS 204 is transitioned to. In step S611, the value for determining whether the pixel is an effective pixel or an ineffective pixel and the value for determining whether the pixel is a pixel of a combining region, which have been referred to in the processing of steps S603 and S604, are updated to the values for the next CIS, which have been specified by the CPU 400, and the processing is performed from step S600 as the processing of the image data of the next CIS. In step S609, when it is determined that the processing of one line's worth of image data has thus been completed, a series of processing by the first buffer reading unit 511 is terminated. The processing by the second buffer reading unit 512 is the same processing as that of the first buffer reading unit 511 thus far. Accordingly, if the first buffer 506 is read as the second buffer 507, the first counter 509 as the second counter 510, and the second counter 510 as the first counter 509 in the description of FIG. 6, the processing can be read as the processing by the second buffer reading unit 512.

FIG. 7 is a diagram for schematically explaining a flow in which the internal combination processing unit 514 according to an embodiment processes image data from the first buffer reading unit 511, the second buffer reading unit 512, and the mask data reading unit 513. In FIG. 7, a horizontal axis is set as a time axis and it is assumed that time progresses from left to right. A state in which, in parallel with that, the image processing by each reading unit advances one pixel at a time is illustrated. In addition, one square indicates image data of one pixel (pixel data).

First, the first buffer reading unit 511 starts processing from the image data of the first CIS 200, and the second buffer reading unit 512 starts processing from the image data of the second CIS 201. Since only the image data of the first CIS 200 is effective up to the first combining region, only the pixel data that has been read out by the first buffer reading unit 511 is passed to the internal combination processing unit 514 as effective image data. At this time, the internal combination processing unit 514 passes the image data of the first CIS 200 as is to the subsequent DMAC output unit 515.

In parallel with this process, the second buffer reading unit 512 processes the image data of the second CIS 201. Since the left end ineffective pixels of the second CIS 201 are image data of ineffective pixels whose image data are not passed to the internal combination processing unit 514, the second buffer reading unit 512 discards the pixel data that has been read out from the second buffer 507. After the second buffer reading unit 512 thus discards the image data of all the pixels in the left end ineffective pixel region, the second buffer reading unit 512 enters a standby state until the processing of the image data by the first buffer reading unit 511 reaches the combining region.

The processing of the image data of the first CIS 200 by the first buffer reading unit 511 up to the first combining region is thus completed, and the processing of the image data that corresponds to the first combining region is transitioned to. Here, the first buffer reading unit 511, the second buffer reading unit 512, and the mask data reading unit 513 pass the image data of the first CIS 200, the image data of the second CIS 201, and the mask data to the internal combination processing unit 514 at the same time. The internal combination processing unit 514 generates one image data in which the image data of the first CIS 200 and the second CIS 201 have been synthesized based on a value of the mask data. In the first combining region, the same processing is performed for the other pixels.

When the processing of the first combining region is thus completed, only the image data that have been read by the second buffer reading unit 512 is passed to the internal combination processing unit 514 as effective data. The internal combination processing unit 514 passes the image data of the second CIS 201 as is to the subsequent DMAC output unit 515.

In parallel with the second buffer reading unit 512 performing image processing, the first buffer reading unit 511 processes pixel data that corresponds to the right end ineffective pixel region of the first CIS 200. Regarding the right end ineffective pixel region of the first CIS 200, pixel data of ineffective pixels are not passed to the internal combination processing unit 514. Accordingly, after the pixel data has been read out from the first buffer 506, the first buffer reading unit 511 discards that read-out pixel data. When the processing of the right end ineffective pixel region of the first CIS 200 is thus completed, the processing of the image data of all the pixels of the first CIS 200 is completed. Then, the first buffer reading unit 511 transitions to the processing of the image data of the third CIS 202.

In parallel to the processing of the image data by the second buffer reading unit 512, the first buffer reading unit 511 processes pixel data that corresponds to the left end ineffective pixel region of the third CIS 202. The processing of the pixel data of ineffective pixels is the same as the processing of the pixel data of ineffective pixels in the first CIS 200 thus far. When the processing of the pixel data that corresponds to the left end ineffective pixel region of the third CIS 202 is completed, the first buffer reading unit 511 enters a standby state until the processing of the second buffer reading unit 512 up to the next combining region is completed. The subsequent processing will be omitted as it is the same processing as the processing of the first combining region onward.

By performing the series of processes thus far for the number of configured CISs, the processing for combining one line's worth of image data is completed. In FIG. 7, a processing time per pixel in the first combining region is illustrated as if it is extended; however, the processing time is extended only to make it visually understandable. Accordingly, the internal combination processing unit 514 can perform the processing for combining image data in the first combining region at a processing time that is not different from a processing time for when outputting the image data of the first CIS 200 and the image data of the second CIS 201 as is.

Figure 8A:
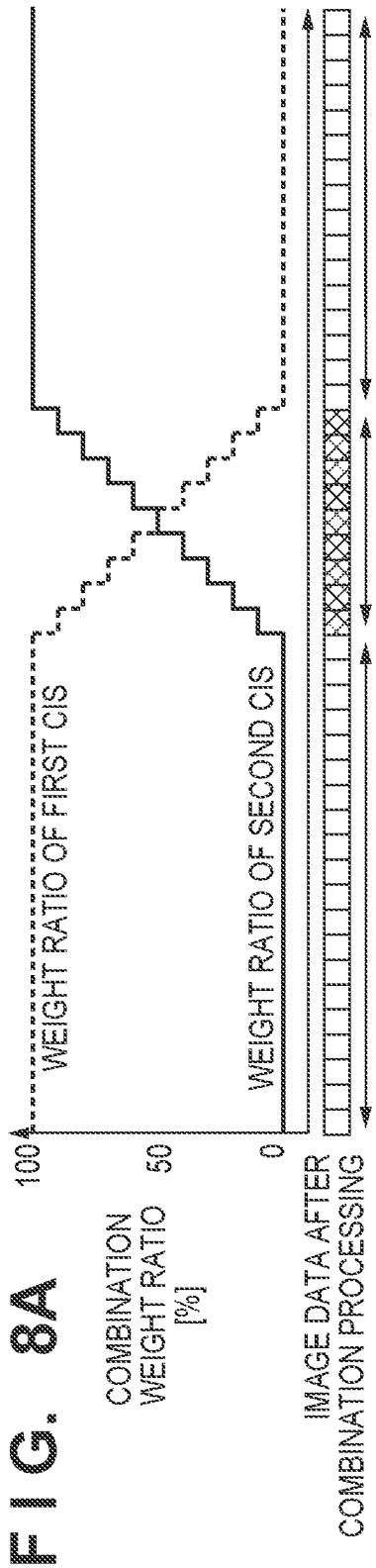
FIGS. 8A and 8B are diagrams illustrating an example of a combination weight ratio and mask data in a combining region portion of a first CIS and a second CIS in image data combination processing in the internal combination processing unit according to an embodiment.
Figure 8B:
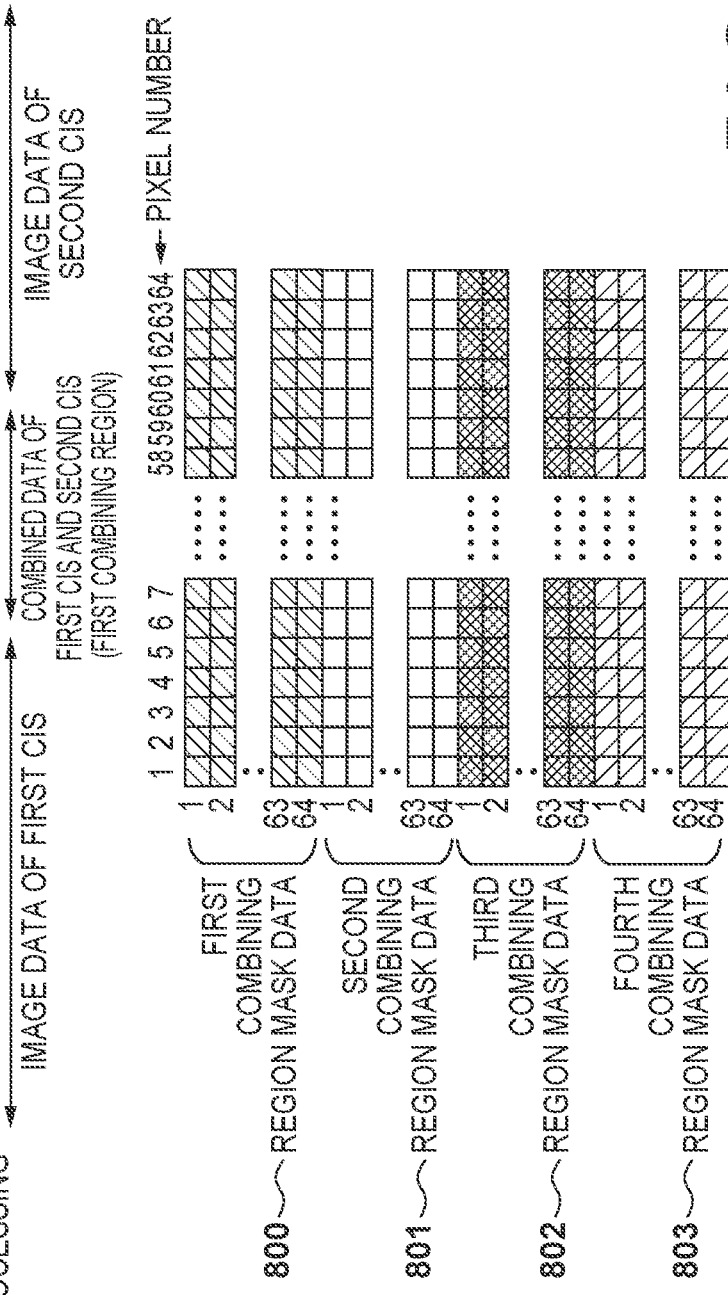

FIGS. 8A and 8B are diagrams illustrating, as an example, an instance of a combination weight ratio in a combining region portion of the first CIS 200 and the second CIS 201 in the processing for combining image data in the internal combination processing unit 514 according to the embodiment.

The mask data represents a combination weight ratio of two image data to be combined. The mask data in the embodiment is set as mask data that is represented in four bits (a maximum value 15). Regarding its relationship with the combination weight ratio illustrated in FIG. 8, since the maximum value of the mask data is 15, the value of 15 means a combination weight ratio of 100%. When the image data of the first CIS 200 to be combined is set as D1, the image data of the second CIS 201 is set as D2, the mask data is set as Md, and the maximum value of the mask data is set as Md.max, image data S after the combination processing is expressed by the following Equation (1).

$$S=(D1\times(Md.max-Md))+D2\times Md)/Md.max \quad \text{Equation (1)}$$

In FIG. 8A, when the image data of the first CIS 200 is outputted as is as an output result of the internal combination processing unit 514, the internal combination processing unit 514 performs combination processing with a combination weight ratio of the first CIS 200 as 100%. In this case, since output data is the image data of the first CIS 200 itself, a method of outputting the image data of the first CIS 200 as is without performing calculation by entering it to Equation (1) may be adopted.

In the processing in a combining region portion in which the image data of the first CIS 200 and the second CIS 201 are combined, the combination processing is performed by gradually decreasing a combination weight ratio of the first CIS 200 and gradually increasing a combination weight ratio of the second CIS 201 as the combination processing in the combining region portion advances. That is, the closer it is to the first CIS 200, the larger the ratio of the image data of the first CIS 200, and the farther it is from the first CIS 200, the smaller the ratio, and conversely, the closer it is to the second CIS 201, the larger the ratio of the image data of the second CIS 201. Finally, the image data of the second CIS 201 is outputted as is as an output result of the internal combination processing unit 514. In this case, the combination processing in the internal combination processing unit 514 is performed with a combination weight ratio of the second CIS 201 as 100%. When this is expressed by Equation (1), the value of the mask data Md is started from 0 and the value of the mask data Md is gradually increased as the combination processing advances in the combining region portion, and finally, when the image data of the second CIS 201 is outputted as is as a output result of the internal combination processing unit 514, the value of the mask data Md is set to "15".

In this example, as a general concept, a description has been given using an example of linearly changing the combination weight ratio; however, mask data that has been obtained by other methods, such as random generation and a polynomial function, may be used. Also, a bit width of the mask data is not limited to four-bit data, which has been described in this example.

FIG. 8B is a diagram illustrating an example of an arrangement of mask data that is stored in the mask memory 500 according to the embodiment.

In the example of FIG. 8B, a region of a mask memory in which a width of a combining region is up to 64 pixels is illustrated, and an example of a mask memory in which mask data of up to 64 lines can be stored for each combining region is illustrated. In the present embodiment, since a configuration is that in which there are five CISs, it is assumed that there are four combining regions.

In the mask memory 500, the mask data of four bits per pixel, which has been described with reference to FIG. 8A, is stored. The mask memory readout control unit 505 sequentially reads out, as the mask data of the first combining region, the mask data in order starting from a first pixel of a first line of first combining region mask data 800, then a second pixel, then a third pixel. In this example, a combining region whose width is up to 64 pixels is assumed; however, if a combining region is configured by only a combining region of 32 pixels, for example, the readout may be terminated after a readout of the mask data of a 32nd pixel without reading up to the 64th pixel as illustrated in FIG. 8B.

When the combination processing of the first combining region is completed, the mask memory readout control unit 505 reads out the mask data starting from a first pixel of a first line of second combining region mask data 801. When the combination processing of the first line of the second combining region is completed, the combination processing of a first line of third combining region mask data 802 is performed; the combination processing is thus sequentially performed. Finally, the combination processing of a first line of fourth combining region mask data 803 is completed.

In the embodiment, a description is given using a scanner that includes five CISs as an example; therefore, processing according to the fourth combining region mask data is performed; however, in a case of a scanner that includes, for example, three CISs, the combination processing according to the second combining region mask data need only be performed.

When the combination processing of the first line is completed and a processing start signal is notified from the operation instruction unit 414 to the internal combination processing unit 514, the combination processing of a second line is started. For the combination processing of the second line, the combining region mask data of the second line is applied in each combining region. Other than utilizing the mask data of the second line, the combination processing of the second line is the same as the combination processing of the first line.

As the lines for which combination processing is to be performed are thus sequentially processed, a request is made for processing of a line beyond 64 lines, which are stored in the mask memory 500. In a case where the combination processing of the 64th line has been completed and processing of a 65th line is to be performed, the mask data of the first line is read out from the mask memory 500 as mask data to be applied to the 65th line. In a case of performing processing of a 66th line, the mask data of the second line, which is the next line, is read out from the mask memory 500 as mask data to be applied to the 66th line. Accordingly, in processing of the next and subsequent lines after the number of lines up to the last line of the mask memory 500, which is the 64th line in the present embodiment, have been read out, a position of the first line is returned to and the mask data is read out from the mask memory 500.

In the embodiment, a data size of the mask memory 500 whose width is up to 64 pixels and maximum number of lines is 64 lines in one combining region has been set; however, the present invention is not limited to these numerical values, and the mask memory may be allocated using numerical values that match the specifications of the image reading device at that time. For example, when the width of the combining region is 32 pixels even at a maximum, configuring a mask memory whose maximum width is 32 pixels can reduce the circuit scale that is required for the mask memory 500 than in a case where the maximum width is 64 pixels, which has been described in the embodiment. Alternatively, if image unevenness in a combining region that is caused by the number of lines of mask data being small can be overlooked to some extent, the maximum number of lines in the mask memory 500 may be reduced. For example, by configuring the maximum number of lines to be 32 lines, it is possible to reduce the circuit scale that is required for the mask memory 500 than in a case where the maximum number of lines is 64 lines as in the embodiment. Meanwhile, if image unevenness cannot be overlooked when the maximum number of lines is 64 lines, the maximum number of lines can be increased, and although the circuit scale increases, reduction of image unevenness can be expected.

Figure 9:
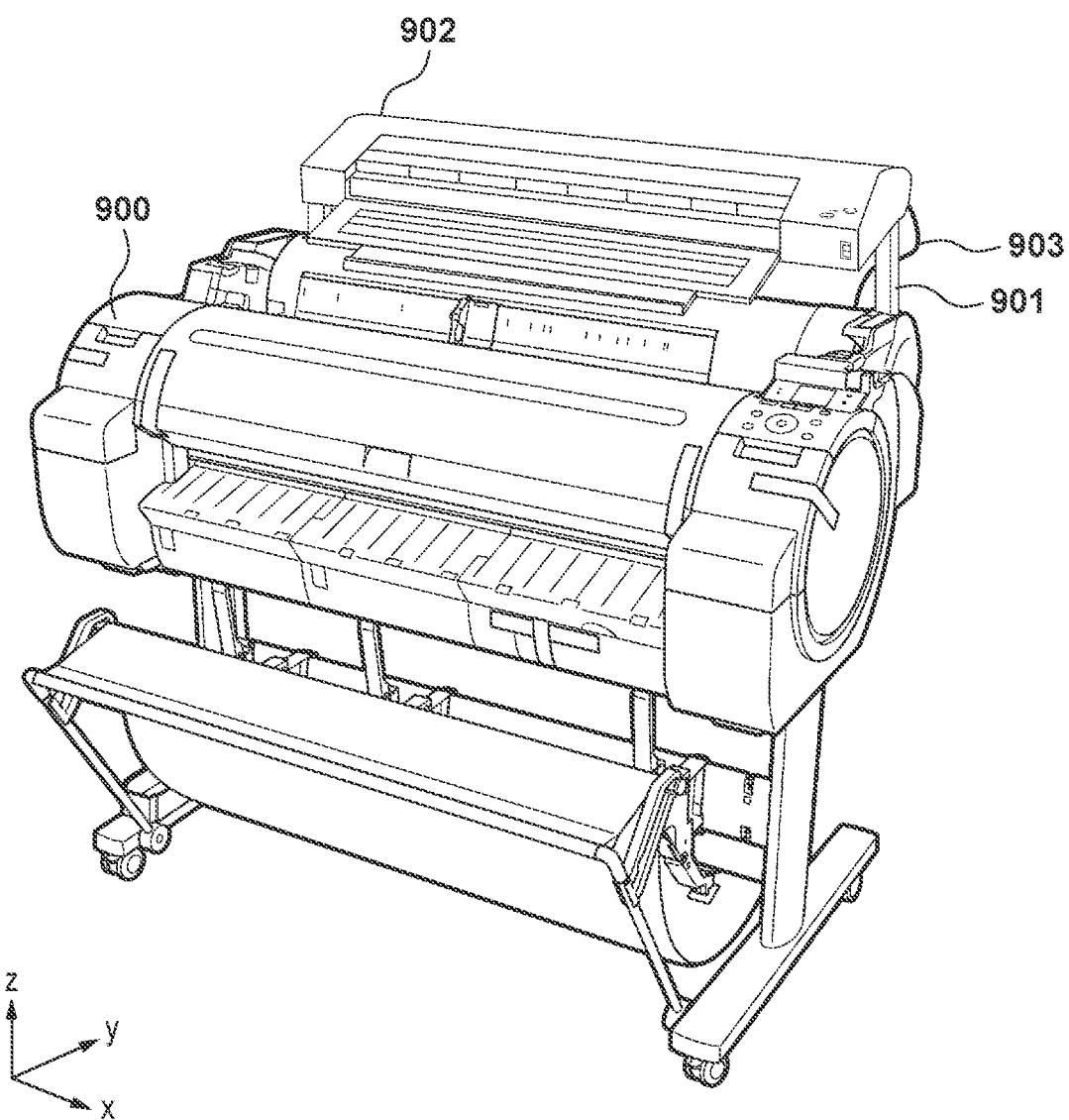
FIG. 9 is an external perspective view of an image forming device that includes a function of reading large-format images according to an embodiment.

FIG. 9 is an external perspective view of an image forming device that includes a function of reading images, for example, of A0-format and B0 format sizes according to an embodiment.

A description will be given using FIG. 9 as an example of an image forming device that includes an image reading function. A configuration is such that a reading device stand 901 is provided in a printing device 900 and an image reading device 902 is held by the reading device stand 901. The printing device 900 and the image reading device 902 are connected by an inter-device connection cable 903, which is used for transmitting image data that has been read by the image reading device 902 to the printing device 900 side, transmitting and receiving sensor signals, transmitting and receiving operation instruction signals from the printing device 900 to the image reading device 902, and the like. The image reading device 902 is a large-format scanner that includes a plurality of CISs. The image reading device 902 has the same configuration as that in FIG. 2. Also in such an image forming device that includes an image reading function, a configuration and an image processing system for performing the above-described combination processing may be adopted.

In the present embodiment, a description has been given using as an example an image reading device that is configured by CISs that are arranged to be staggered.

FIG. 10 is a diagram illustrating an example of an arrangement of CISs according to another embodiment.

The present invention can also be applied, for example, when the CISs 200 to 204 are arranged in a stepped shape as in FIG. 10A and when the CISs 200 to 204 are arranged a convex shape as in FIG. 10B. Accordingly, arrangement need only be such that the end portions of the plurality of CISs overlap each other in the main scanning direction when viewed from the sub-scanning direction, and the present invention is not limited to an aspect of a staggered arrangement as in the embodiment. The number of CISs is also not limited to the number that has been described in this embodiment.

As described above, according to the embodiment, when reading out, in image processing in a combining region, image data that has been read by the plurality of image sensors and then stored in a memory, it becomes possible to read out the image data of the plurality of image sensors from the memory at the same time.

In addition, since the image data of combining regions of the image data of the plurality of image sensors that have been read out from the memory can be stored in buffers in parallel, the buffers may be smaller in size. Accordingly, it is unnecessary to provide a large buffer for temporarily storing the image data of the entire region of the combining region as in the prior art. Therefore, it is possible to reduce the circuit scale.

Further, in the coupling region, since it is possible to process the image data of the two image sensors at the same time, the processing speed is increased.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-215137, filed Dec. 28, 2021, which is hereby incorporated by reference herein in its entirety.

What is claimed is:

1. An image reading device comprising:
a plurality of linear image sensors that are arranged so that adjacent image sensors include an overlapping region in which portions of reading regions of the adjacent image sensors overlap in a main scanning direction in which a document is read;

a buffer configured to store image data obtained by the plurality of linear image sensors reading a predetermined line of the document; and a circuit including at least one processor, and configured to perform:

determining image data that corresponds to a plurality of overlapping regions by reading out the image data stored in the buffer;

synthesizing first image data obtained by a first linear image sensor and second image data obtained by a second linear sensor so as to generate image data of each of the plurality of overlapping regions, the first linear image sensor and the second linear sensor being adjacent in the main scanning direction among the plurality of linear image sensors;

generating image data of the predetermined line of the document based on image data in which the image data of each of the plurality of overlapping regions are excluded from the image data stored in the buffer and the image data of each of the plurality of overlapping regions generated by the synthesizing; and repeatedly executing, in a sub-scanning direction of the document, the determining, the synthesizing, and the generating on the predetermined line of the document.

2. The image reading device according to claim 1, wherein the circuit is configured to perform counting the number of pixels of the image data that has been read out from the buffer, wherein in the determining, each of the plurality of overlapping regions is determined based on a counted value counted by the counting.

3. The image reading device according to claim 1, wherein in a case where the plurality of linear image sensors include an ineffective pixel region for which it is assumed that obtained image data is to be discarded, image data, excluding image data that corresponds to the ineffective pixel region, is synthesized in the synthesizing, and in the generating, the image data of the predetermined line of the document, excluding from the image data that has been stored in the buffer the image data that corresponds to the ineffective pixel region, are further generated.

4. The image reading device according to claim 1, wherein in the synthesizing, the first image data and the second image data are synthesized based on ratio data for synthesizing the first image data that corresponds to the overlapping region and the second image data that corresponds to the overlapping region.

5. The image reading device according to claim 4, wherein the ratio data is data in which a proportion of the first image data increases as the first linear image sensor is approached in the overlapping region and a proportion of the second image data increases as the second linear image sensor is approached in the overlapping region.

6. An image reading device comprising:

a plurality of linear image sensors that are arranged so that adjacent image sensors include an overlapping region in which portions of reading regions of the adjacent image sensors overlap in a main scanning direction in which a document is read;

a first buffer configured to store image data obtained by a first linear image sensor, which reads the document precedingly among the plurality of linear image sensors, reading an image of a predetermined line of the document;

a second buffer configured to store image data obtained by a second linear image sensor, which is subsequent to the first linear image sensor among the plurality of linear image sensors, reading an image of the predetermined line of the document; and a circuit including at least one processor, and configured to perform:

synthesizing first image data that corresponds to the overlapping region among the image data stored in the first buffer and second image data that corresponds to the overlapping region among the image data stored in the second buffer so as to generate image data of the overlapping region;

generating image data of the predetermined line that corresponds to the first linear image sensor and the second linear image sensor based on image data in which image data of the overlapping region are excluded from the image data stored in the first buffer, image data in which the image data of the overlapping region are excluded from the image data stored in the second buffer, and the image data generated by the synthesizing; and executing, across in a sub-scanning direction of the document, the synthesizing and the generating.

7. The image reading device according to claim 6, wherein the plurality of linear image sensors are arranged to be staggered in two rows in the main scanning direction.

8. The image reading device according to claim 6, wherein the circuit is configured to perform counting the number of pixels of the image data read out from the first buffer and the number of pixels of the image data the second buffer, respectively, wherein in the synthesizing, the first image data that corresponds to the overlapping region and the second image data that corresponds to the overlapping region are determined based on each counted value counted by the counting.

9. The image reading device according to claim 6, wherein in a case where the first linear image sensor and/or the second linear image sensor includes an ineffective pixel region for which it is assumed that obtained image data is to be discarded, image data that corresponds to the ineffective pixel region is out of the synthesizing.

10. The image reading device according to claim 6, wherein in the synthesizing, the first image data and the second image data are synthesized based on ratio data for synthesizing the first image data that corresponds to the overlapping region and the second image data that corresponds to the overlapping region.

11. The image reading device according to claim 10, wherein the ratio data is data in which a proportion of the first image data is increased as the first linear image sensor is approached in the overlapping region and a proportion of the second image data is increased as the second linear image sensor is approached in the overlapping region.

12. A method of controlling an image reading device that includes a plurality of linear image sensors that are arranged so that adjacent image sensors include an overlapping region in which portions of reading regions of the adjacent image sensors overlap in a main scanning direction in which a document is read, the method comprising:

storing image data obtained by the plurality of linear image sensors reading a predetermined line of the document;

determining image data that corresponds to a plurality of overlapping regions with reading out the image data stored in the storing;

synthesizing first image data obtained by a first linear image sensor and second image data obtained by as second liner sensor so as to generate image data of each of the plurality of overlapping regions, the first linear image sensor and the second linear sensor being adjacent in the main scanning direction among the plurality of linear image sensors;

generating image data of the predetermined line of the document based on image data in which image data of the plurality of overlapping regions are excluded from the image data stored in the storing and the image data of each of the plurality of overlapping region generated in the synthesizing; and controlling so as to repeatedly execute, in a sub-scanning direction of the document, the storing, the determining, the synthesizing, and the generating on the predetermined line of the document.

13. A method of controlling an image reading device that includes a plurality of linear image sensors that are arranged so that adjacent image sensors include an overlapping region in which portions of reading regions of the adjacent image sensors overlap in a main scanning direction in which a document is read, the method comprising:

first buffering image data obtained by a first linear image sensor reading an image of a predetermined line of the document, the first linear image sensor reading the document precedingly among the plurality of linear image sensors;

second buffering image data obtained by a second linear image sensor reading an image of the predetermined line of the document, the second linear image sensor being subsequent to the first linear image sensor among the plurality of linear image sensors;

synthesizing first image data that corresponds to the overlapping region among the image data stored in the first buffering and second image data that corresponds to the overlapping region among the image data stored in the second buffering so as to generate image data of the overlapping region; and generating image data of the predetermined line corresponding to the first linear image sensor and the second linear image sensor based on image data in which image data of the overlapping region are excluded from the image data stored in the first buffering, image data in which the image data of the overlapping region are excluded from the image data stored in the second buffering, and the image data generated in the synthesizing; and controlling so as to execute, across in a sub-scanning direction of the document, processing in the first buffering, the second buffering, the synthesizing, and the generating.

* * * * *